United States Patent [19]

Jensen et al.

[11] 3,714,837
[45] Feb. 6, 1973

[54] INDEXIBLE CLUTCH MECHANISM

[76] Inventors: Ole R. Jensen, 126 Nottingham, Montvale, N.J. 07645; Preben W. Jensen, 21 Southside Avenue, Somerville, N.J. 08876

[22] Filed: June 23, 1970

[21] Appl. No.: 48,965

[52] U.S. Cl. .................................74/125.5, 192/45.1
[51] Int. Cl. .................................F16d 27/01
[58] Field of Search.....74/125.5; 192/45.1, 41 A, 44, 192/43.1

[56] References Cited

UNITED STATES PATENTS

| | | | |
|---|---|---|---|
| 3,422,941 | 1/1969 | Fredell | 192/12 B |
| 2,384,110 | 9/1945 | Malmquist | 74/116 |
| 3,096,673 | 7/1963 | Spohn et al | 74/125.5 |
| 3,243,023 | 3/1966 | Boyden | 192/44 |
| 3,216,544 | 11/1965 | Ryan | 192/41.3 |
| 2,971,402 | 2/1961 | Lovercheck | 192/44 |
| 3,086,405 | 4/1963 | Fleming | 192/43.1 |
| 3,300,002 | 1/1967 | Roper | 192/44 |

*Primary Examiner*—Milton Kaufman
*Assistant Examiner*—Wesley S. Ratliff, Jr.
*Attorney*—Sughrue, Rothwell, Mion, Zinn & Macpeak

[57] ABSTRACT

An incremental, angular, intermittent input motion is provided by means of a cam and follower arrangement to a double acting clutch mechanism. The angular input motion will be imparted to an output member through a portion of the one-way clutch mechanism and any attempt to overrun the predetermined indexing angle will be prevented by the other portion of the double acting one-way clutch mechanism. Any retrograde motion of the output member will be resisted by the binding of the input linkage connected intermediate the double acting one-way clutch mechanism and the cam follower to thereby provide positive control of the output member at all times. A modified arrangement provides for converting a constantly rotating input motion to a variable intermittent output motion utilizing a double acting one-way clutch mechanism operable under the control of a pair of pawls which control the clutch locking and unlocking member.

8 Claims, 10 Drawing Figures

INVENTORS
OLE R. JENSEN
PREBEN W. JENSEN

BY Sughrue, Rothwell, Mion, Zinn & Macpeak

ATTORNEYS

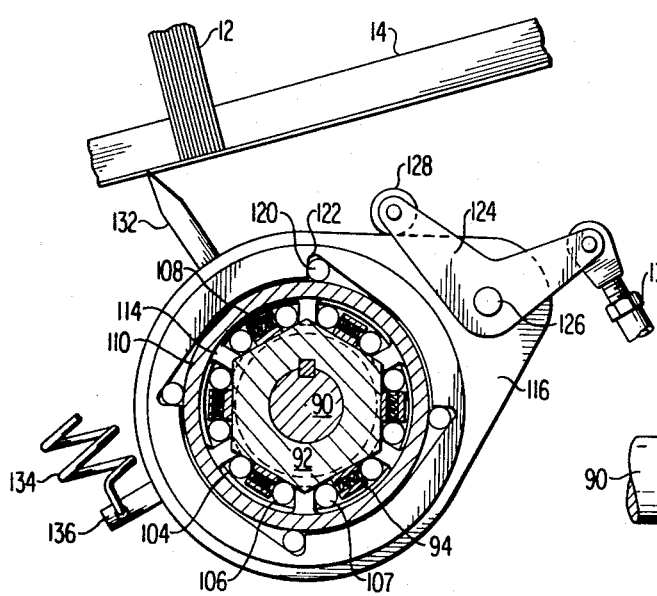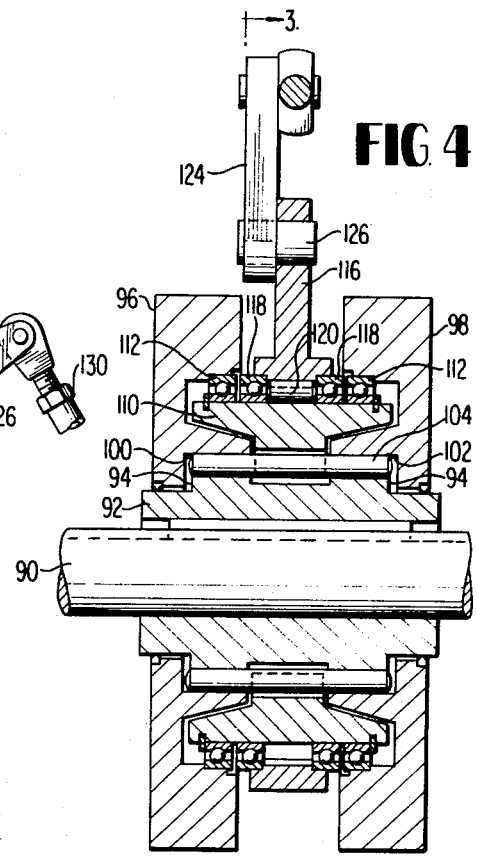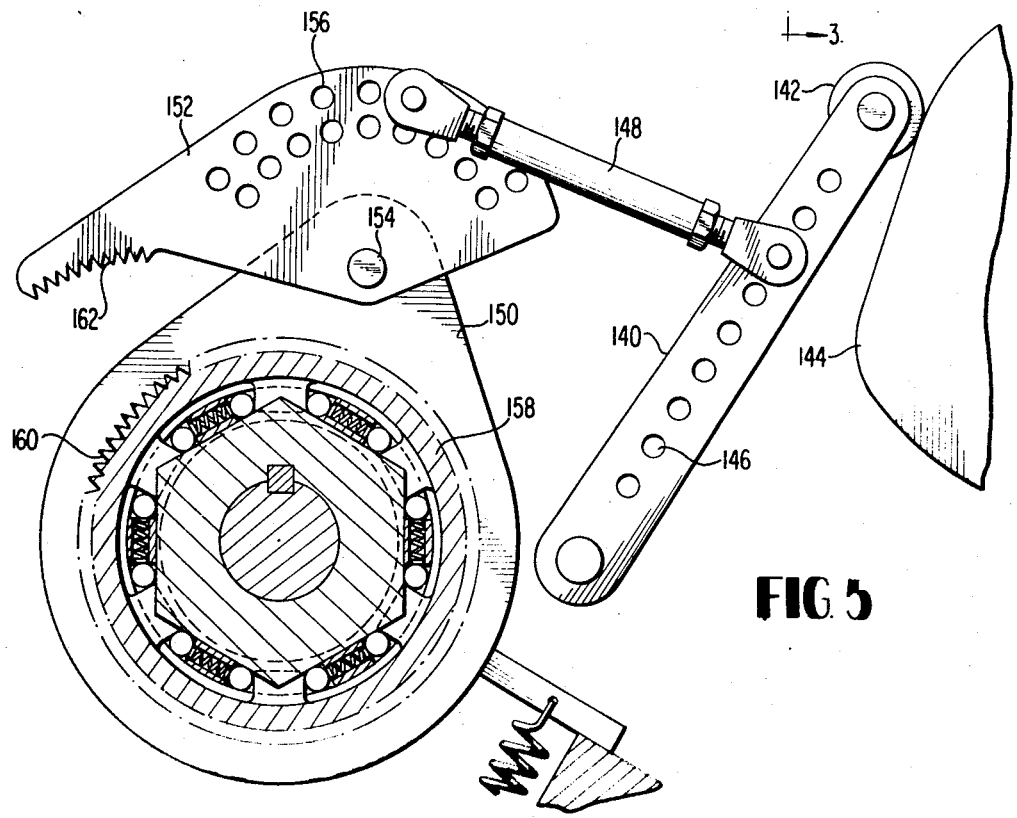

INVENTOR
OLE R. JENSEN
PREBEN W. JENSEN

ATTORNEYS

INDEXIBLE CLUTCH MECHANISM

BACKGROUND OF THE INVENTION

1. Field of the Invention

The present invention is directed to an indexible clutch mechanism and more specifically to a clutch mechanism utilizing a double acting one-way clutch wherein the output member is under positive control at all times. The particular clutch mechanism is especially suitable for feeding sheets from a stack which is advanced incrementally subsequent to the removal of each sheet from the stack.

2. Prior Art

The problems with feeding varying stock thickness of a material from a hopper are often severe. These are basically three ways that this can be accomplished. The first is a gravity feed where the feeding is done from the bottom of the hopper, the second where feeding is from the top in which case the stack can be raised by a spring, pneumatic or hydraulic force and the third method is the inclined feed method where the stack is fed by conveyor chain along an inclined plane and the feeding is done from the bottom of the stack.

With respect to the first gravity feed method a vacuum device is generally utilized to turn the edge of a single sheet down and an arm with a gripper device thereon will grasp the sheet and pull it out from the hopper. Although such an arrangement is advantageous in that loading can be done from the top without stopping the machine, the increase in friction between the bottom sheet and the next sheet becomes greater as the stack height increases. In order to overcome this problem air jets have been utilized to reduce this friction but at the same time significantly add to the cost of the device.

With respect to the second top feed method, a suction device is generally utilized to grip the top sheet and transfer to the next handling station. Although such a system is devoid of friction problems due to stack height and is capable of a wide degree of motion with respect to the sheet transfer, such a system is severely limited in that it is necessary to stop the machine for loading. The third inclined feed method eliminates many of the disadvantages and incorporates many of the advantages from the two previously described arrangements. According to this method, the stack is usually advanced by a one-way clutch mechanism operable under the control of a cam follower and a return spring. The stack is fed by the conveyor and the feeding of sheets is not affected by stack height and the loading of the hopper can be accomplished without the necessity of stopping the machine. However, in order that the operator does not disturb the position of the stack when loading, different devices such as brakes and/or a pawl wheel device have been utilized but in all instances have been found to be deficient in one aspect or another. The use of brakes increase the necessary operating forces and a pawl and rachet arrangement only allows for feeding in steps. Furthermore, the stack could accidentaly be fed forward or backward by the operator causing a jam or no feed at all.

Thus, the principal difficulty with the prior art method utilizing the inclined feed resided in the failure to provide an incremental feed device which provided a positive control for the output member under all conditions of operation.

SUMMARY OF THE INVENTION

The present invention is directed to a novel indexible clutch mechanism particularly suitable for use in providing an incremental output such as that necessary for the feeding of an inclined stack while maintaining the output under positive control at all times by means of the clutch mechanism.

The present invention provides an indexible clutch mechanism capable of providing an adjustable incremental output movement while positively preventing over-feed or reverse feed of the output member during all portions of the clutches operating cycle.

The present invention provides a novel indexible clutch mechanism which is simple in construction, reliable in operation and extremely accurate.

The present invention provides an indexible clutch mechanism having an oscillating input device which enables the indexing to be repeated without accumulating error.

The present invention is directed to an indexible clutch mechanism having an input member having a radially extending arm thereon and adapted to be oscillated about an output shaft, bell crank lever means pivoted on said arm, reciprocating drive means connected to one arm of said bell crank lever, reaction surface means arranged to be contacted by the other arm of said bell crank lever, whereby upon pivotal movement of said bell crank lever into engagement with the reaction surface means by said drive means an incremental angular motion will be imparted to said input member, opposed one-way gripping means engaging said output shaft to prevent rotation thereof in either direction, operator means adapted to release said gripper means and to impart said incremental angular movement to said output shaft and one-way clutch means for engaging said input member with said operating means.

The present invention is also directed to an indexible clutch device having a constantly rotating input journaled for rotation upon an output shaft, opposed one-way gripping means disposed intermediate said rotating input means and said output shaft, operating means journaled for rotation about said shaft and having means for controlling said one-way gripper means, frame means, opposed pawl means pivotally mounted on said frame means and disposed in opposed locking relation to said operating means, means for individually pivoting said pawls out of engagement with said operating means to release said operating means and allow engagement of said gripper means to impart motion from said rotary input member to said output shaft for as long as said pawl means are held out of engagement with said operating means.

The present invention is capable of embodiment in many different forms and for the purpose of illustration will be described with respect to several embodiments shown in the accompanying drawings and described in detail hereinafter.

BRIEF DESCRIPTION OF THE DRAWINGS

FIG. 3 is a side elevational view, partly in section, of a modified form of the present invention.

FIG. 4 is a partial sectional view of the clutch shown in FIG. 3.

FIG. 5 is a side elevational view, partly in section of another modified form of clutch device.

DETAILED DESCRIPTION OF THE INVENTION

Although the clutch device according to the present invention, is capable of many uses in numerous environments requiring an incremental drive the operation of the clutch device will be explained hereinafter in conjunction with the incremental feeding of a stack of sheets into the proper position for the individual feeding of the sheets from the stack. In order to accomplish such an operation accurately and reliably under all conditions of operation, it is necessary to maintain the drive under positive control at all times so that any disturbance of the stack such as would be caused by replenishment during operation would not be transmitted in either direction to the drive mechanism.

Figure 1:
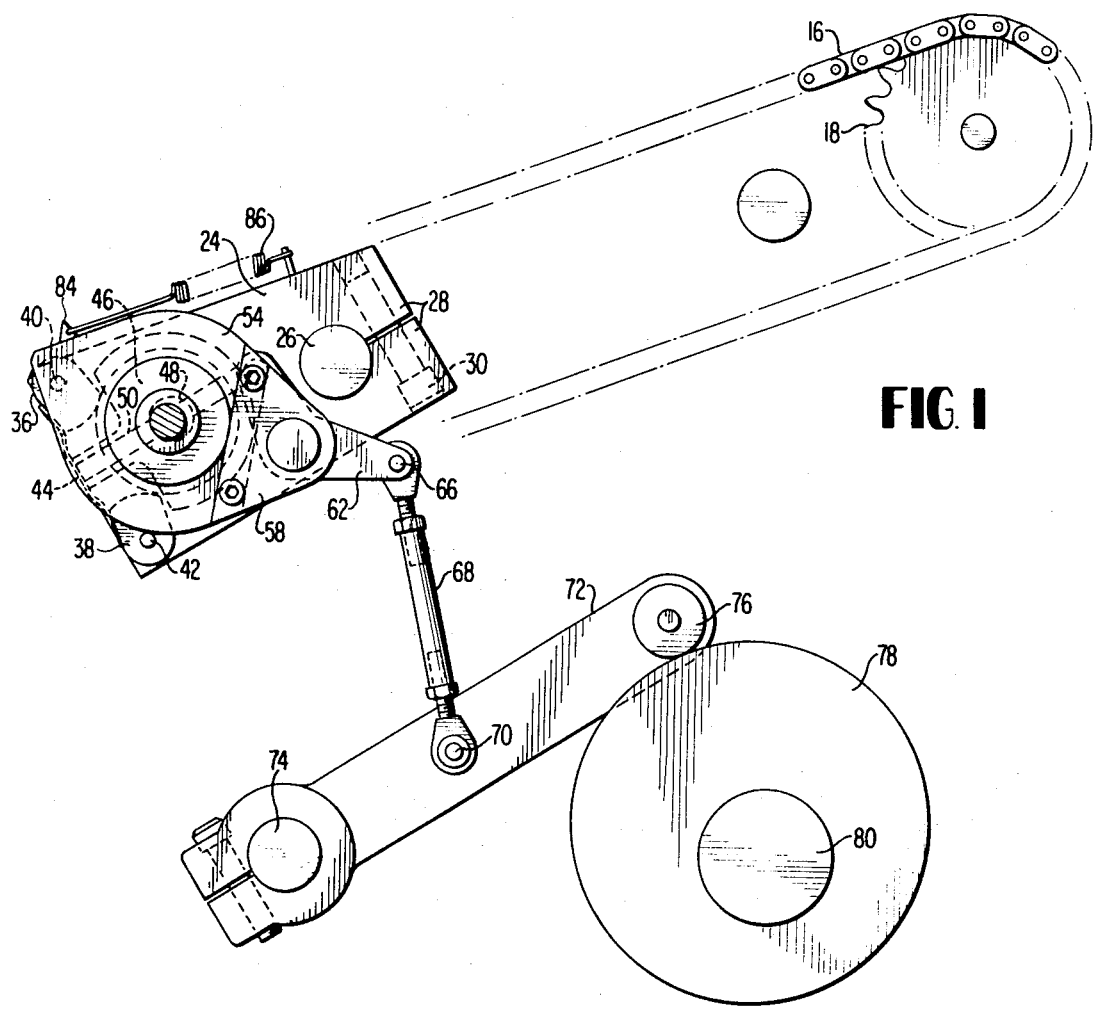
FIG. 1 is a side elevational view of one form of the present invention.
Figure 2:
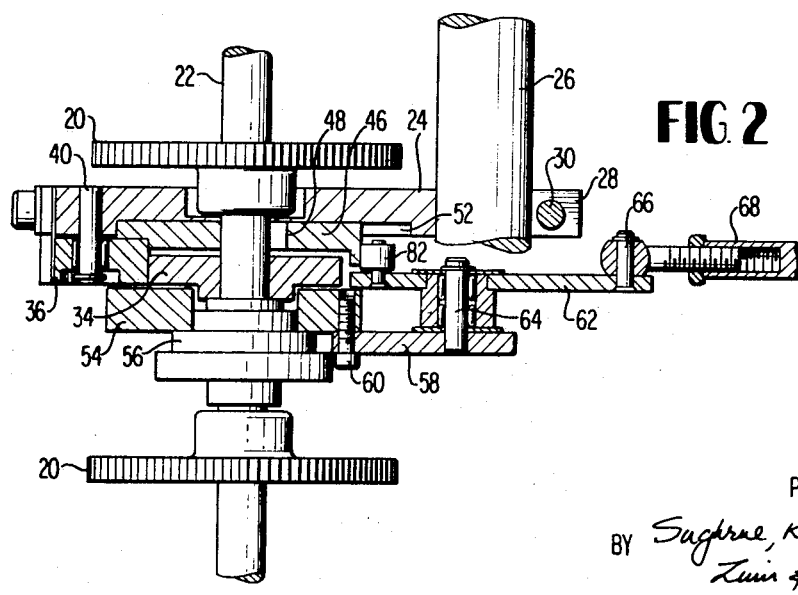
FIG. 2 is a partial sectional view of the device shown in FIG. 1.

A stack of sheets 12 may be supported in any suitable inclined holder 14 (FIG. 3) which provides for the engagement of the stack by a corrugated conveyor chain or chains 16 which are disposed over idler sprockets 18, only one of which is shown in FIG. 1 and drive sprockets 20, two of which are shown in FIG. 2. The drive sprockets 20 are secured to a shaft 22 which is journaled for rotation by any suitable means (not shown) in the frame of the machine. A support plate 24 is secured to a stationary rod 26 by means of the opposed arms 28 which are drawn together and clamped on rod 26 by means of bolt 30. The support plate 24 is provided with an enlarged aperture to provide suitable clearance for the hub of sprocket 20 which extends therein.

A hub 34 is secured to the shaft 22 for rotation therewith. A pair of sprags 36 and 38 are pivoted to the support plate 24 on pins 40 and 42 respectively. The sprags are biased into locking engagement with the hub 34 by means of spring member 44 which is secured to both sprags 36 and 38. A sprag control member 46 is provided with an enlarged opening 48 surrounding shaft 22 and is provided with a key 50 guided for sliding engagement in a groove 52 formed in the support plate 24.

A drive hub 54 is mounted for oscillatory movement about the shaft 22 and is connected thereto by means of a one-way clutch mechanism 56 of any suitable construction. An extension arm 58 is secured to the drive hub 54 by means of screws 60 and a bell crank lever 62 is pivoted thereon about pin 64. One arm of the bell crank lever 62 is pivotally connected at 66 to one end of an adjustable link 68. The opposite end of toggle link 68 is pivotally connected at 70 to a cam follower arm 72 pivoted to the frame on axle 74. The cam follower arm 72 is provided with a cam follower roller 76 disposed in engagement with a cam 78 connected to a constantly rotating drive shaft 80. The opposite arm of the bell crank lever 62 is provided with a roller 82 adapted to engage the end of the sprag control member 46. The opposite end of the sprag control member is disposed in engagement with the sprags 36 and 38. A pointer or feeler arm 84 is connected for rotation with the drive hub 54 and is biased to the right as viewed in FIG. 1 by means of spring 86 which is secured at the opposite end to the support plate 24.

The operation of the embodiment as shown in FIGS. 1 and 2 will now be described. The constantly rotating eccentric 78 imparts a constant angular oscillatory movement to the cam follower arm 72 which in turn reciprocates the adjustable link 68 back and forth a predetermined distance. Initially, the pawls 36 and 38 will be biased into locking engagement with the hub 34 by means of the spring 44 to prevent any movement of the shaft 22 and the stack advancing sprocket chain 16 in either direction.

The initial portion of the reciprocating stroke of link 68 will pivot the bell crank lever 62 about pin 64 to bring the roller 82 into engagement with one end of the spring control member 46 and shift the sprag control member to the left as viewed in FIG. 1. This movement of the sprag control member 46 will cause both pawls 36 and 38 to move against the action of spring 44 out of engagement with the hub 34 to free the same for rotation. The movement of the sprag control member 46 is limited by the aperture surrounding the shaft 22 and upon reaching a set limit of movement the sprag control member 46 will provide a reaction member for the bell crank lever 62. Thus, continued reciprocatory movement of the connecting link 68 in the same direction will rotate the input hub 54 and its arm 58 in a counter-clockwise direction about shaft 22. The end surface of the sprag control member 46 is sufficiently large to enable a roller 82 to travel thereon and still maintain the sprag control member is the sprag unlocking position. During this counter-clockwise rotation of the drive hub 54, the one-way clutch 56 will be engaged to transmit the movement to the shaft 22 which in turn will advance the sprocket chain the desired increment.

When the link 68 reaches the end of its stroke it will reciprocate in the opposite direction thereby pivoting the bell crank lever 62 in a clockwise direction allowing the spring 44 to bias the sprag control member 46 through the sprags to the right as viewed in FIG. 1 and to bias the sprags 36 and 28 into locking engagement with the hub 34. The spring 86 will bias the pointer or feeler arm 84 against the face of the stack which has been advanced thereby limiting the return movement of the drive hub 54 which is disengaged from the shaft 22 through the one-way coupling 56. The bottom of the stack will now be in the proper position for a feeding movement to take place with respect to the bottom sheet of the stack. This feeding movement of the sheet will take place during the return stroke of the connecting link and cam follower arm 72 and will be completed prior to the initiation of the next cycle of operation which will advance the stack in a predetermined increment.

During the incremental feeding movement of the stack, the clutch device maintains positive control over the stack so that the stack will not be disturbed by external forces, such as replenishment of the supply of sheets at the top end of the stack. The critical moment is when the conveyor chain is being advanced and the sprags 36 and 38 are out of locking engagement with the hub 34. When the stack on the chain 16 is pushed forward beyond the desired increment the drive hub 54 and arm 58 will be moved in a counter-clockwise direction as viewed in FIG. 1 due to engagement of the feeler arm 84 by the face of the stack. Since the connecting link 68 cannot move, the bell crank lever 62 will pivot about 66 in a clockwise direction as the pivot 66 for the bell crank lever 62 moves in a counter-clockwise direction. This motion will cause the roller 82 to move away from the sprag control member 46 and the spring 44 will push the sprag control member 46 through the sprags 36 and 38 and cause the sprags to engage the hub 34 and prevent further motion.

Also, at the same critical time, if the stack or chain 16 is pushed backward, the bell crank lever 62 will jam between the connecting link 68 and the pawl control member 46. During all other situations, the pawls 36 and 38 will be jammed against the hub 34 and prevent any motion in either direction. Therefore, the operator cannot accidentally move the stack forward or backward.

The embodiment shown in FIGS. 3 and 4 is similar in operation to the clutch arrangement shown and described above with respect to FIGS. 1 and 2 inasmuch as the incremental advancing movement of the stack is under positive control at all times, especially during the critical period when the output shaft is unlocked for advancing movement. In this embodiment, the stack 12 is supported by suitable guides 14 which allow the corrugated chain and sprocket arrangement to advance the stack. The drive sprockets will be mounted for rotation with the output shaft 90. A hub 92 is also secured to the shaft 90 for rotation therewith and is provided with a hexagonal surface having a projection 94 disposed in the middle of each face and projecting radially outwardly. A pair of stationary end plates 96 and 98 are each provided with a circular recess 100 and 102 respectively, which are concentrically disposed with respect to the projections 94 on the hub member 92. A plurality of pairs of rollers 104 and 106 are provided, with the rollers of each pair disposed on opposite sides of the projection 94. A spring member 108 is mounted in a bore in each of the projections 94 with the opposite ends thereof bearing against the two rollers on opposite sides of the projection. Thus, the rollers in each pair are biased in opposite directions into wedged engagement between the hub 92 and the surfaces 100 and 102 on stationary members 96 and 98 respectively.

A clutch control member 110 is journaled for rotation by means of bearings 112 on the stationary side members 96 and 98. The clutch control member 110 is substantially ring shaped and is provided with a plurality of radially inwardly directed projections 114 which extend between adjacent pairs of rollers 104 and 106. A clutch input member 116 is journaled for rotation on the clutch control member 110 by means of bearings 118 and may be selectively coupled to the clutch control member 110 by means of a one-way clutch comprised of rollers 120 located in notches 122 in the inner circumference of the clutch input member 116. The notches 122 are provided with a tapered wall which extends tangentially with respect to the outer circumference of the clutch control member 110 to provide with a wedging engagement of the roller 120 between the tapered wall of the recess 122 and the outer circumference of the clutch control member 110. A bell crank lever 124 is pivotally mounted on an extension of the clutch input member 116 by means of pivot 126. One arm of the bell crank lever 124 is provided with a roller 128 adapted to engage the outer surface of the clutch input member 116 and the other arm of the bell crank lever 124 is secured to an adjustable link 130 similar to the link 68 in FIG. 1. The link 130 will be reciprocated in a manner similar to the manner in which link 68 is reciprocated. A feeler arm 132, is secured to the clutch input member 116 and is adapted to be biased into engagement with the front of the stack 12 by means of spring member 134 connected between an ear 136 secured to the clutch input member 116 and a portion of the stationary frame.

The operation of the embodiment shown in FIGS. 3 and 4 is very similar to the operation of the embodiment described above with respect to FIGS. 1 and 2. As the link 130 is reciprocated upwardly as viewed in FIG. 3, the bell crank lever 124 will pivot counter-clockwise to bring the roller 128 into engagement with the surface of the clutch input member 116. Continued movement of the link 130 in the same direction will then cause the clutch input member 116 to rotate in a counter-clockwise direction about the output shaft 90 and the roller 120 will drivingly couple the clutch input member to the clutch control member. As the clutch control member 110 is rotated in a counter-clockwise direction, the radially inwardly directed projections 114 will engage all of the rollers 104 moving them out of locking engagement between the stationary frame and the hub 92 and into engagement with the lugs 94 to rotate the hub 92 and the output shaft 90 in a counter-clockwise direction. This rotation will then be imparted to the conveyor chain and stack in the same manner as described above with respect to FIG. 1. Upon return movement of the reciprocating link 130 in the opposite direction, the lever 124 will be pivoted in a clockwise direction allowing the spring 134 to rotate the clutch input member in a clockwise direction. The one-way clutch roller 120 will now be ineffective and the springs 108 in the lugs 94 will bias the rollers 104 and 106 into locking engagement to hold the stack in the new position. The spring 134 will rotate the clutch input member 116 until the feeler 132 engages the front face of the stack 12.

As set forth above with respect to the embodiment of FIGS. 1 and 2, the stack is prevented from undesired movement in either the forward or reverse direction during the critical moment when the output shaft 90 is unlocked from the stationary frame members 96 and 98. If any undesirable overtravel of the stack takes place in the forward direction, the rollers 104 will immediately be moved back into wedging engagement between the hub 92 and the stationary frame members 96 and 98. If any undesirable movement of the stack takes place in the reverse direction, the rollers 106 will immediately be disposed in wedging engagement between the hub 92 and the stationary frame members 96 and 98.

In these embodiments shown in FIG. 5, an arrangement is provided whereby a plurality of different angles can be indexed and the indexing can be repeated without accumulating any error. The cam follower lever 140 which is provided with a roller 142 disposed in following engagement with a cam 144 is provided with a plurality of apertures 146. The connecting link 148 may be connected to the cam follower lever through any one of these apertures so as to vary the distance the point of connection will travel. The clutch input member 150 is similar to the clutch input member 116 described above with respect to FIGS. 3 and 4 and a lever 152 is pivoted on an extension thereof at 154. The lever 152 is similar to the bell crank lever 124 insofar as the function thereof is concerned but the lever 152 is provided with a plurality of apertures 156 through which the other end of the connecting link 148 may be connected. A clutch control member 158 is journaled on the frame of the machine, similar to the clutch control member 110 in FIGS. 3 and 4. However, the clutch control member 158 is provided with a plurality of teeth 160 disposed about the circumference thereof. A plurality of complementary teeth 162 are provided on an extension of lever 152 and are disposed along an arc complementary to the circumference of the clutch control member 158.

In operation, the connecting link 148 can be connected to any combination of apertures 146 and 156 to achieve a variable input to thereby vary the clutch indexing angle. As in the previous embodiments, as the connecting link 148 is reciprocated to the left, as viewed in FIG. 5, the lever 152 will pivot counter-clockwise about pivot pin 154 to bring the teeth 162 into meshing engagement with teeth 160. Continued reciprocating movement of the link 148 in the same direction will then cause the clutch input member 150 and the clutch control member 158 to oscillate in a counter-clockwise direction through a pr-determined angle. Thus, the teeth 160 and 162 take the place of the rollers 120 and 128 in FIG. 3. The non-accumulative error effect is obtained by the meshing of the teeth 160 and 162. As long as the accumulative error is less than half a tooth pitch, the engagement of the teeth will compensate for the error during meshing. The remaining portion of the operation of the clutch mechanism in FIG. 5 is identical to that described above with respect to FIGS. 3 and 4.

Figure 6:
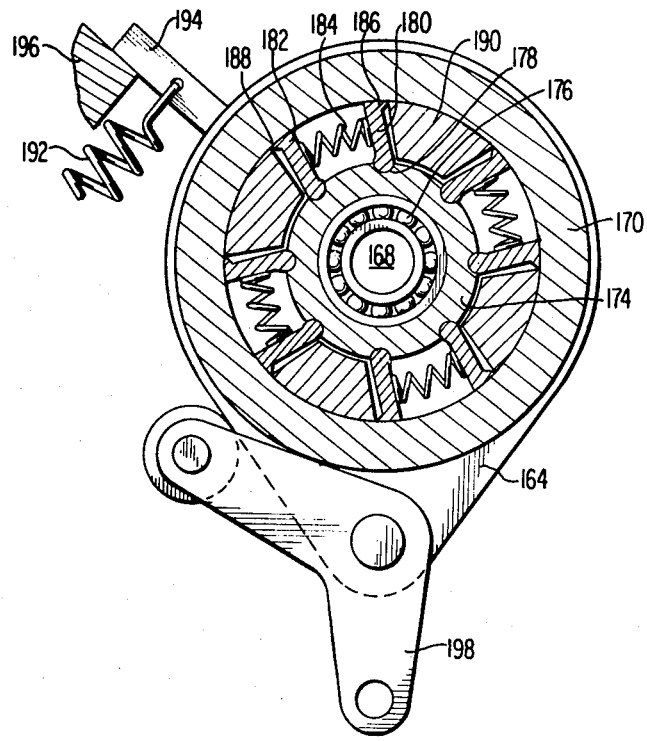
FIG. 6 is a sectional view taken along the lines 6—6 of FIG. 7 and showing a still further modified form of the clutch device according to the present invention.
Figure 7:
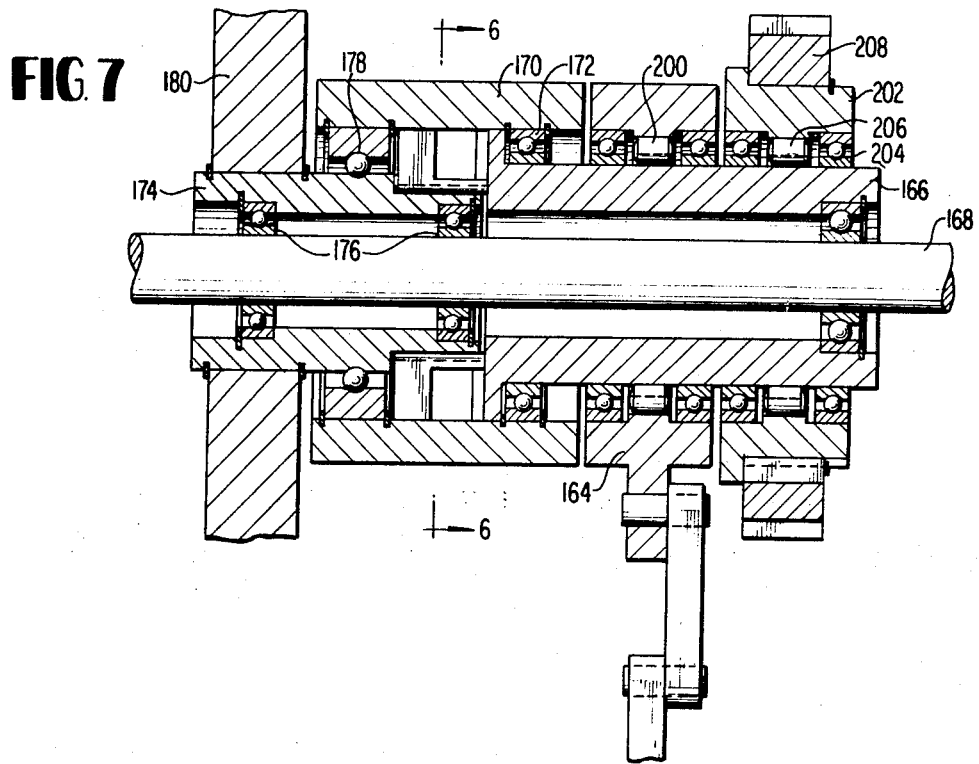
FIG. 7 is a longitudinal sectional view of the clutch device shown in FIG. 6.

In the embodiment of FIGS. 6 and 7, sprag clutch devices are utilized in lieu of the roller clutch devices of FIGS. 3 and 4. The clutch input member 164 is journaled for rotation on clutch control member 166 which in turn is journaled for rotation on shaft 168 which may be stationary or rotatable depending upon the particular machine involved. The clutch control member is also journaled for rotation within a cylindrical stationary member 170 by means of bearings 172. A cylindrical output sleeve 174 is journaled for rotation relative to the shaft 168 by means of bearings 176 and is journaled for rotation relative to the stationary sleeve 170 by means of bearings 178. A suitable output member 180, such as a gear, pulley, sprocket or the like, may be secured to the cylindrical output sleeve 174 for rotation therewith. The end of the output sleeve 174 which is telescopically received within the stationary sleeve 170 is provided with a plurality of sockets 178 in which a plurality of sprags 180 and 182 are pivotally mounted in a generally radially extending manner. A plurality of springs 184 are disposed between each pair of sprags 180 and 182 to bias the same apart into wedged locking engagement between the output sleeve 174 and the stationary sleeve 170. Each of the sprags 180 and 182 are provided with a projection 186 and 188 respectively, extending away from the spring member 184. The clutch control member 166 is provided with a plurality of projections 190 which extend axially between the sprags 182 and 184 adjacent the side thereof having the projections 186 and 188 thereon. A spring member 192 is secured at one end to the frame and at the other end to an ear 194 which is secured to the clutch input member 164 to bias the clutch input member in a counter-clockwise direction as viewed in FIG. 6 against the housing 196.

In the operation of the clutch arrangement shown in FIGS. 6 and 7, the bell crank lever 198 is pivoted in a clockwise direction as viewed in FIG. 6 in a manner similar to the pivoting of the bell crank lever 124 in FIG. 3. The pivotal movement of bell crank lever 198 subsequently causes clockwise movement of clutch input member 164 which also rotates the clutch control member 166 in a clockwise direction through one-way clutch 200. The rotation of the clutch control member 166 brings the axial projections 190 into engagement with the projections 188 on sprags 182 thereby disengaging all of the sprags 182 from the stationary sleeve 170. Continued rotation of the clutch control member 166 brings the axial projections 190 into engagement with the base of the sprags adjacent their sockets thereby imparting clockwise rotation to the output sleeve 174. The sprags 180 will merely be dragged along during this portion of the cycle. Since a driving force will no longer be imparted to clutch input member 164 in the clockwise direction, the spring 192 will rotate the clutch input member 164 in the counter-clockwise direction until the ear 194 engages the stop or housing 196. During this return movement of the clutch input member 164, the clutch input member will be disengaged from the clutch control member 166 by means of the one-way clutch 200 and the springs 184 will bias the pawls 180 and 182 into locking engagement with the stationary sleeve 170 to prevent any further motion of the output sleeve 174. After the ear 194 engages the stop 196, the bell crank lever 198 will continue to pivot in the counter-clockwise direction about its pivot point until the connecting link (not shown) which is connected thereto begins to reciprocate in the opposite direction to begin another cycle.

Once again, in this particular clutch embodiment any undesirable forward or reverse movement of the output sleeve 174 is prevented at all times by the oppositely acting sprags 180 and 182. The particular clutching arrangement shown in FIG. 7 is also capable of many variations such as a second input member. For example, a second clutch input member 202 may be journaled on the clutch control member 166 by means of bearings 204 and may be connected to the clutch input member 166 for rotation in one direction or the other by means of a one-way clutch 206. A gear 208 may be secured to the second clutch input member 202 to impart continuous or intermittent rotation thereto in one direction or the other. The gear 208 may also be driven in an oscillatory manner.

It is further possible to vary the arrangement shown in FIG. 7 by connecting the clutch output sleeve 174 to the shaft 178 by means of a spline or the like, so that the incremental indexing is imparted to the shaft 168. Another variation of the arrangement shown in FIG. 7 would be to connect the sleeve 174 to ground and have the sleeve 170 arranged as the output member. In this case, the sprags would have to be inverted with respect to their present arrangement as shown in FIG. 6. Such an arrangement would also be possible using either rollers or balls which would be operable under the control of the clutch control member 166, much in the same way as the arrangement described above with respect to FIG. 3.

Figure 8:
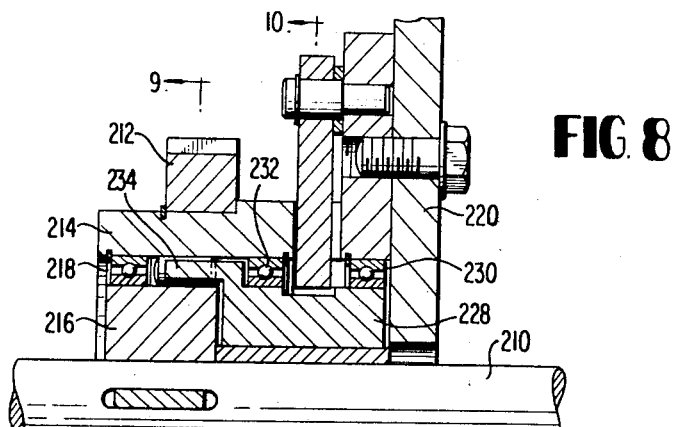
FIG. 8 is a longitudinal sectional view of another modified form of clutch device according to the present invention.
Figure 9:
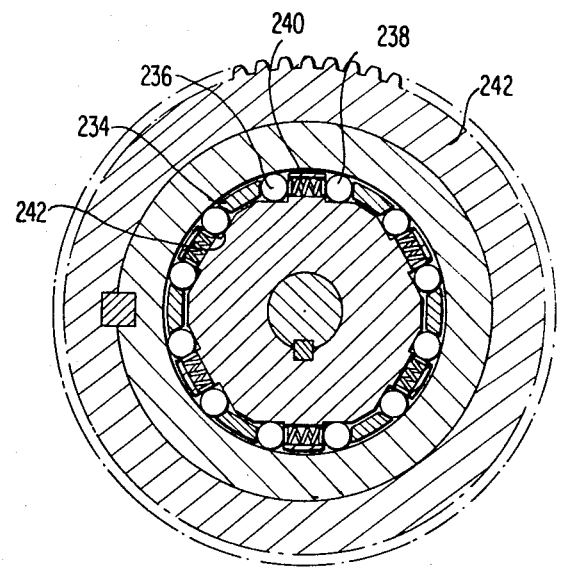
FIG. 9 is a sectional view taken along the line 9—9 in FIG. 8.
Figure 10:
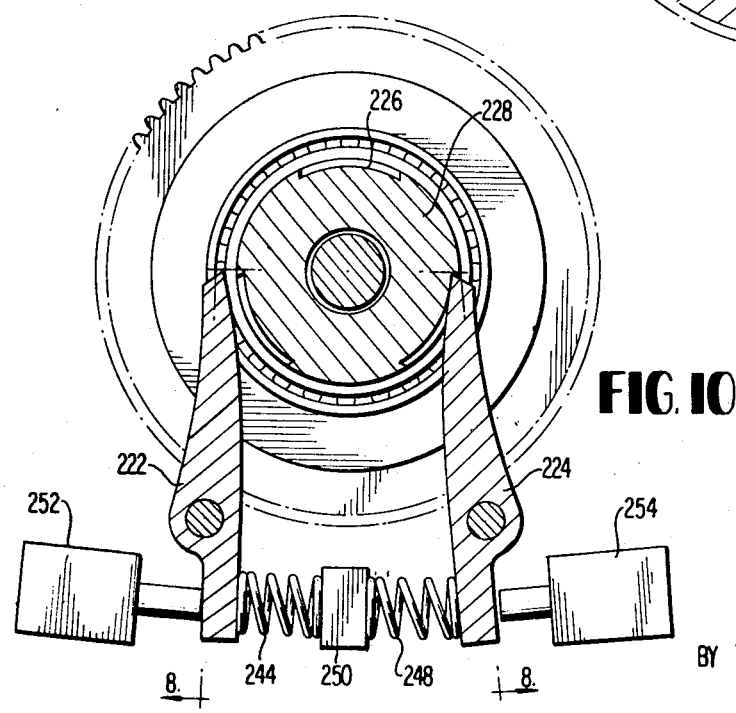
FIG. 10 is a sectional view of the clutch device taken along the line 10—10 in FIG. 8.

In the embodiment shown in FIGS. 8-10 inclusive, a clutching arrangement is provided for converting rotary input motion to intermittent rotary output motions. In this embodiment it is desired to impart intermittent rotary movement to the output shaft 210 from a constantly rotating input gear 212 connected for rotation to an input sleeve 214. An output hub 216 is splined to shaft 210 for rotation therewith and the input sleeve 214 is journaled thereon by means of bearing 218. A support plate 220 carries a pair of pivotally mounted pawls 222 and 224 which are adapted to be pivoted into or out of engagement with notches 226 formed in a clutch control member 228 journaled for rotation on the support plate by means of bearings 230. The input sleeve 214 is journaled for rotary movement with respect to the clutch control member 228 by means of bearings 232. The clutch control member 228 is provided with a plurality of axial projections 234 which extend between a plurlaity of pairs of rollers 236 and 238. Each pair of balls or rollers 236, 238 are biased apart from each other by means of springs 240 which tend to force the balls or rollers into wedging engagement between the inner cylindrical surface of input member 214 and the flat chordal surfaces on the outer circumference of the output hub 216. The pawls 222 and 224 are normally biased into engagement with the clutch control member 228 by means of springs 244 and 248 respectively which bear against a stationary member 250. Pawl actuators 252 and 254 are associated with the pawls 222 and 224 respectively and may be electrically, hydraulically, pneumatically or manually operated to pivot the pawls against the force of their associated springs out of engagement with the notches 226 and the circumference of the clutch control member 228.

In operation, the gear 212 may be constantly rotating in either direction and for purposes of the present example we can assume the gear 212 to be rotating clockwise as viewed in FIG. 9. With the pawl 224 engaged in the notch 226 in the clutch control member 228, the clutch control member 228 will be prevented from rotating. Thus, the rotation of input sleeve 214 in the clockwise direction would normally tend to rotate the output hub 216 in the same direction through the rollers 238 but since the clutch control member 228 is held stationary, the projections 234 thereon will engage the balls or rollers 238 and maintain them out of wedging engagement between the input sleeve 214 and the output hub 216. If pawl 224 is released from engagement with the notch 226 in the clutch control member 228 by means of actuation of the actuator 254, the clutch control member 228 will then be free to rotate and the rollers 238 will be allowed to jam between the sleeve 214 and hub 216, thereby imparting rotation to the output shaft for as long as the pawl 224 is held out of engagement by means of the pawl actuator 254. Suitable control means can be provided for the actuator so that several revolutions or a fraction of a revolution may be imparted to the output shaft 210. If the gear 212 is rotating in the opposite direction, the same operation will take place with the pawl 222, actuator 252 and balls or rollers 236 being involved in the operation. It is also possible to operate the present arrangement with a single pawl which could control the clutch control member in either direction of rotation.

The device shown in FIGS. 8-10 could also operate if the input 24 were driven in an intermittent manner. Predetermined angular output movements are obtained by providing suitable timing for the operation of the pawls 222 and 224. To accomplish this, the gear 212 could be oscillated on the input member 214 through a suitable angle by any suitable means and connected thereto by a one way clutch. Likewise, an oscillatory link member having a bell crank lever thereon connected to a reciprocatory drive means could be mounted on the input 214 and connected thereto by a one way clutch. Both of these oscillatory arrangements are similar to those shown in FIG. 7 as alternate inputs. With this arrangement, the indexing could be stopped without stopping the machine by engagement of pawls 222 and 224.

Although the clutch device according to the present invention has been described in conjunction with a sheet feeding mechanism in several of the embodiments, it is obvious that the clutch arrangement has utility in numerous other environments wherein an incremental output motion is required and wherein it is desirable to keep the output member under positive control at all times to prevent unwanted forward or reverse motion of the same during the operation of the clutch.

What is claimed is:

1. An indexible clutch mechanism suitable for indexing an output member comprising an oscillatable input member and a rotatable output member mounted for rotation about a common axis, reciprocating drive means, bell crank lever means pivotally mounted on and adjacent to the circumference of said input member, means connecting one arm of said bell crank lever to said reciprocating drive means, reaction surface means located adjacent the free end of the other arm of said bell crank lever means whereby initial movement of said reciprocating drive means in one direction will pivot said bell crank lever against said reaction surface means and continued movement of said reciprocating drive means in the same direction will impart angular movement to said input member about said axis, one way clutch means arranged to connect said input member to said output member, locking means operably engagable with said output member for preventing undesirable rotation of said output member in either direction said locking means including a a pair of opposed sprags pivotally mounted on a stationary frame member adjacent said output member, spring means biasing said sprags into engagement with said output member to prevent rotation thereof, control means operatively connected to said oscillatable input member and operable for selected periods to release said locking means to permit said input member to advance said output member through said one-way clutch means while still enabling said locking means to prevent undesirable reverse or forward over-run movement of said output member during the indexing of said output member, said control means comprising a slidable member mounted on said stationary frame for sliding movement transversely of said axis, said sliding member having sprag contacting surfaces on one side of said axis and a reaction surface on the opposite side of said axis for engagement with said bell crank lever, said slidable member being movable by said bell crank lever, and further comprising additional spring means connected between said input member and said stationary frame member for moving said input member in the reverse direction upon reverse movement of said reciprocating drive means.

2. An indexible clutch mechanism suitable for indexing an output member comprising an oscillatable input member and a rotatable output member mounted for rotation about a common axis, one way clutch means arranged to connect said input member to said output member, locking means operably engagable with said output member for preventing undesirable rotation of said output member in either direction, and control means operatively connected to said oscillatable input member and operable for selected periods to release said locking means to permit said input member to advance said output member through said one-way clutch means while still enabling said locking means to prevent undesirable reverse or forward over-run movement of said output member during the indexing of said output member, and further comprising stationary frame means, hub means on said output member located concentrically within and spaced from said stationary frame means and having a plurality of radially outwardly directed projections thereon, a plurality of pairs of rollers disposed within the space between said stationary frame means and said hub means with the rollers of each pair diposed on opposite sides of a respective projection, spring means normally biasing said rollers into wedging engagement between said stationary frame means and said hub means to prevent rotation of said output member in either direction, said control means comprising a cylindrical sleeve surrounding said roller means and provided with a plurality of radially inwardly directed projections between each of said pairs of rollers, one way clutch means disposed between said input member and said control means whereby angular movement of said input member in one direction drives said control means to unlock said rollers from wedging engagement and drives said output member through the projections on said hub.

3. A clutch mechanism as set forth in claim 2 further comprising reciprocating drive means, bell crank lever means pivotally mounted on and adjacent to the circumference of said input member, means connecting one arm of said bell crank lever to said reciprocating drive means, and reaction surface means located adjacent the free end of the other arm of said bell crank lever means whereby initial movement of said reciprocating drive means in one direction will pivot said bell crank lever against said reaction surface means and continued movement of said reciprocating drive means in the same direction will impart angular movement to said input member about said axis.

4. A clutch mechanism as set forth in claim 3 further comprising spring means connected between said stationary frame means and said input member for moving said input member in the opposite direction and wherein said reaction surface means is comprised of the outer periphery of said rotatable input member on which said bell crank means is pivoted.

5. A clutch mechanism as set forth in claim 4 wherein the outer surface of said cylindrical control means is provided with a plurality of teeth to provide the reaction surface means and said bell crank lever means is provided with a plurality of complementary teeth disposed along an arc complementary to said cylindrical control member for engagement with the teeth thereon.

6. An indexible clutch mechanism suitable for indexing an output member comprising an oscillatable input member and a rotatable output member mounted for rotation about a common axis, reciprocating drive means, bell crank lever means pivotally mounted on and adjacent to the circumference of said input member, means connecting one arm of said bell crank lever to said reciprocating drive means, said bell crank lever means being provided with a plurality of apertures through which said reciprocating drive means may be connected by said connecting means and further comprising an oscillating lever means having a plurality of apertures disposed in radially spaced relation through which the opposite end of said reciprocating connecting means may be connected, and reaction surface means located adjacent the free end of the other arm of said bell crank lever means whereby initial movement of said reciprocating drive means in one direction will pivot said bell crank lever against said reaction surface means and continued movement of said reciprocating drive means in the same direction will impart angular movement to said input member about said axis, one way clutch means arranged to connect said input member to said output member, locking means operably engagable with said output member for preventing undesirable rotation of said output member in either direction, and control means operatively connected to said oscillatable input member and operable for selected periods to release said locking means to permit said input member to advance said output member through said one-way clutch means while still enabling said locking means to prevent undesirable reverse or forward over-run movement of said output member during the indexing of said output member.

7. An indexible clutch mechanism suitable for indexing an output member comprising an oscillatable input member and a rotatable output member mounted for rotation about a common axis one way clutch means arranged to connect said input member to said output member, reciprocating drive means, bell crank lever means pivotally mounted on and adjacent to the circumference of said input member, means connecting one arm of said bell crank lever to said reciprocating drive means, and reaction surface means located adjacent the free end of the other arm of said bell crank lever means whereby initial movement of said reciprocating drive means in one direction will pivot said bell crank lever against said reaction surface means and continued movement of said reciprocating drive means in the same direction will impart angular movement to said input member about said axis, locking means operably engagable with said output member for preventing undesirable rotation of said output member in either direction, and control means operatively connected to said oscillatable input member and operable for selected periods to release said locking means to permit said input member to advance said output member through said one way clutch means while still enabling said locking means to prevent undesirable reverse or forward over-run movement of said output member during the indexing of said output member, wherein said output member is provided with a plurality of circumferentially spaced socket means, a plurality of pairs of oppositely directed sprags pivotally mounted in said socket means, each of said pairs of sprags being biased apart into locking engagement with a stationary surface means to prevent rotation of said output shaft, said control means being connected to said input member through said one way clutch means and being provided with a plurality of projections adapted to extend between said pairs of sprags for releasing said sprags and rotating said output member upon rotation of said input member.

8. An indexible clutch mechanism suitable for indexing an output member comprising an oscillatable input member and a rotatable output member mounted for rotation about a common axis, one way clutch means arranged to connect said input member to said output member, locking means operably engagable with said output member for preventing undesirable rotation of said output member in either direction, and control means operatively connected to said oscillatable input member and operable for selected periods to release said locking means to permit said input member to advance said output member through said one way clutch means while still enabling said locking means to prevent undesirable reverse or forward over-run movement of said output member during the indexing of said output member, wherein said input member is continuously rotating and said one-way clutch means is comprised of a plurality of pairs of oppositely acting one-way clutch devices, stationary frame means, said control means mounted for rotation on said frame means coaxially with said output member and having a plurality of projections extending between said pairs of one-way clutch devices, locking pawl means pivotally mounted on said frame means and engaging said control means to normally disengage said one-way clutch devices to prevent transmission of rotation from said input member to said output member and means for selectively unlocking said pawl means from said control means to transmit rotation from said input member to said output member through said one-way clutch devices for a period determined by the pawl control means.

* * * * *